United States Patent Office 3,031,289
Patented Apr. 24, 1962

3,031,289
SOLID COMPOSITE PROPELLANTS CONTAINING HETEROPOLYMERIZED POLYESTER RESINS
Joseph Philipson, Temple City, Calif., assignor, by mesne assignments, to Aerojet-General Corporation, Cincinnati, Ohio, a corporation of Ohio
No Drawing. Filed Feb. 5, 1951, Ser. No. 209,509
8 Claims. (Cl. 149—2)

This invention relates to resins and particularly to resins useful as ingredients for rocket propellants.

The principal object of my invention is to provide polyester resins useful for making copolymers obtained by vinyl and/or allyl type of copolymerization, which have good physical properties over a wide range of temperatures from substantially elevated temperatures, and which when incorporated into a propellant will furnish high specific impulse.

Polyesters have heretofore been formed by reacting a polyhydric alcohol with a polycarboxylic acid. To permit heteropolymerization with an olefinic type compound the polyester component has some unsaturation, which is provided by a mixture of unsaturated polycarboxylic acid or anhydride and saturated polycarboxylic and/or anhydride. The polyesters are copolymerized with a monomeric olefinic component such as a vinyl, allyl or other olefin, compatible with the resin. Such resins and propellants containing them are described and claimed in the copending application of Roy Roberts, Serial No. 109,409, filed August 9, 1949, entitled "Propellant Substance," and assigned to the same assignee as the present application. Propellant is made by including an oxidizer, such as ammonium or potassium perchlorate, ammonium nitrate, etc., with the resin, to provide the oxygen for burning the resin.

Especially good physical properties of the resin are obtained by selecting esters of acrylic acid as the olefinic component. Butyl acrylate is the preferred acrylic acid ester although other esters can be used to produce resins with somewhat inferior physical properties. When these materials are copolymerized with the proper polyesters, a resin results which does not become too brittle at a very low temperature or show viscous flow at a very high temperature. A propellant of unusually high impulse can be obtained by using allyl ammonium perchlorate as a component of the resin fuel. A propellant combining the desired good physical properties and high impulse is obtained when the butyl acrylate and the allyl ammonium perchlorate are both used. Heretofore, when it has been attempted to copolymerize polyesters with butyl acrylate and allyl ammonium perchlorate, it was found that most polyesters are not sufficiently soluble in the butyl acrylate to tolerate the presence of the allyl ammonium perchlorate. In fact, the presence of allyl ammonium perchlorate tends to make the polyester even more insoluble in butyl acrylate. As a result the ingredients would separate and the desired copolymerization would not occur, or if it did occur, the copolymers would be generally unsatisfactory.

I have found that a polyester resin compounded by using polyethylene glycols and/or polypropylene glycols, instead of the polyhydric alcohols ordinarily used to form the resin, is unusual in that it is sufficiently soluble in n-butyl acrylate to tolerate the presence of allyl ammonium perchlorate in substantial quantities. Such polyester resin can be used to provide a series of polyester copolymers obtained by vinyl and/or allyl type of copolymerization.

The polyester resins which I prefer to use are formed by reacting with dicarboxylic acid, polyethylene glycols or polypropylene glycols having the general formula:

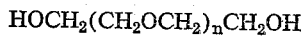

and

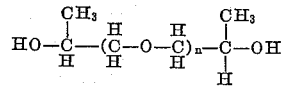

respectively in which $n$ is a whole number ranging from 3 to 7. The molecular weight of such polyethylene glycol mixture will ordinarily range from 300 to 650, and of the propylene glycol mixture, from 425 to 700.

To permit copolymerization the dicarboxylic acid should include both saturated and unsaturated dicarboxylic acid.

The mole ratio of dibasic acid (saturated dicarboxylic acid) to unsaturated dicarboxylic acid should be, preferably, from about 6 to about 15 dibasic acid to about one part unsaturated acid, the optimum ratio being about 9 to 1.

The mole ratio of glycol (polyhydric alcohol) to the total amount of dibasic acid and unsaturated acid should be, preferably, from about 0.5 to about 2, the optimum ratio being 1 to 1.

The polyethylene glycol or polypropylene glycol can be condensed with the dicarboxylic acid in a manner similar to the formation of other polyesters.

Examples of dicarboxylic acids that are suitable for carrying out this invention are the saturated dicarboxylic acids such as glutaric, adipic, pimelic, azelaic, sebacic, etc.; the preferred saturated dicarboxylic acids having between 4 and 10 carbon atoms in the primary chain; and examples of the unsaturated polycarboxylic acids which are suitable for carrying out this invention are the aliphatic unsaturated acids such as maleic, fumaric, citraconic, mesaconic and itaconic acid. The anhydrides of maleic, citraconic, itaconic and phthalic acids may also be used.

The polyesters are normally formed by reacting the polyethylene or polypropylene glycols having the molecular weight in the prescribed range, with the saturated and unsaturated dicarboxylic acids. The condensation normally starts at 140° C. and is continued at this temperature for approximately 16 hours at which time most of the water formed by the reaction will have been driven off. To insure complete polymerization of the molecule, and to obtain a usable polyester, the polymerization is then continued for approximately 72 hours longer at a temperature not exceeding 250° C. The preferred temperature range at this stage of the condensation is between 200° C. and 230° C. with the usual temperature about 210° C. The condensation is continued until the polyester has reached the desired degree of polymerization as determined by the acid number or viscosity measurements. The preferred degree of polymerization for the polyester is between 5 and 100.

Examples of polyesters formed in this manner are as follows:

Resin 1.—10.5 moles of polyethylene glycol (molecular weight 300), 9.0 moles of adipic acid and 1.0 mole of maleic anhydride.

Resin 2.—10.5 moles polypropylene glycol (molecular weight 425), 9.0 moles of adipic acid and 1.0 mole of maleic anhydride.

Resin 3.—10.5 moles of polyethylene glycol (molecular weight 300), 9.0 moles of glutaric acid and 1.0 mole of fumaric acid.

Resin 4.—10.5 moles of polyethylene glycol (molecular weight 300), 9.0 moles of pimelic acid and 1.0 mole of maleic anhydride.

Resin 5.—10.5 moles of polyethylene glycol (molecular weight 600), 9.0 moles of sebacic acid and 1.0 mole of maleic anhydride.

*Resin 6.*—10.5 moles of polypropylene glycol (molecular weight 425), 9.0 moles of azelaic acid and 1.0 mole of maleic anhydride.

*Resin 7.*—10 moles of polyethylene glycol (molecular weight 300), 9.0 moles of adipic acid and 1.0 mole of maleic anhydride.

*Resin 8.*—10 moles of polypropylene glycol (molecular weight 425), 9.0 moles of azelaic acid, and 1.0 mole of fumaric acid.

*Resin 9.*—10 moles of polypropylene glycol (molecular weight 600), 9.0 moles of sebacic acid and 1.0 mole of fumaric acid.

All of the above polyesters are sufficiently soluble in n-butyl acrylate to permit copolymerization with a vinyl and/or allyl compound in the presence of substantial percentages of allyl ammonium perchlorate. For example, compositions can be compounded within the range shown below:

| | Percent by weight |
|---|---|
| Esters of acrylic acid | 30–50 |
| Polyesters of the type described above | 25–35 |
| Methyl acrylate | 5–15 |
| Diallyl diglycollate | 5–10 |
| Allyl ammonium perchlorate | 5–15 |

The following composition produces a satisfactory copolymer:

| | Percent by weight |
|---|---|
| N-butyl acrylate | 40 |
| Methyl acrylate | 8 |
| Resin 2 | 31 |
| Allyl ammonium perchlorate | 10 |
| Diallyl diglycollate | 5 |

To assist the polymerization about 1.0% by weight of methyl amyl ketone peroxide can be added to the above mixture. Other suitable catalysts are the organic peroxides and peresters, such as for example, tertiary butyl hydroperoxide, 1 - hydroxycyclohexyl hydroperoxide - 1, methyl ethyl ketone peroxide, benzoyl peroxide, cumene hydroperoxide, lauryl peroxide, methyl amyl ketone peroxide, t-butyl perbenzoate, di-t-butyl diperphthalate, etc.

Preferably about 0.1% by weight of an accelerator is also added to permit polymerization to take place at lower temperatures, as the preferred copolymerization takes place at the lowest possible temperature. The accelerator can be any aluminum, cobalt, or iron organic salt that is double in the above mixture.

Where the catalyst and accelerator are both employed the polymerization is started at about 70°–80° F., and continues for a suitable time until a substantial polymerization has occurred. The temperature is gradually raised to 180° F. At this point the entire mixture will have substantially copolymerized.

An advantage of my invention is that it is possible to incorporate into the polymer appreciable amounts of allyl ammonium perchlorate. This compound substantially assists in developing a high specific impulse propellant and in some cases also increases the burning rate of the propellant. Unless the polyesters are formed with the polyethylene glycol or polypropylene glycol the mixture will not copolymerize successfully with n-butyl acrylate to which there has been added allyl ammonium perchlorate.

I claim:

1. A solid propellant resin formulation comprising from about 30% to 50% lower alkyl acrylate, from about 5% to 15% methyl acrylate, from about 5% to 10% diallyl diglycollate, and from about 5% to 15% by weight of the total resin formulation of allyl ammonium perchlorate heteropolymerized with from about 25% to 35% by weight of the total resin formulation of alkyd resin comprising the copolymerization product of a glycol selected from the group consisting of a mixture of polyethylene glycols having a molecular weight of from about 300 to about 650 and having the formula:

$$HO-CH_2-(CH_2-O-CH_2)_n-CH_2OH$$

wherein $n$ is a whole number from 3 to 7 inclusive, a mixture of polypropylene glycols having a molecular weight of from about 425 to about 700 and having the formula:

$$HO-CH-(CH_2-O-CH_2)_m-CH-OH$$
$$\phantom{HO-}CH_3 \phantom{(CH_2-O-CH_2)_m-}CH_3$$

wherein $m$ is a whole number from 3 to 7 inclusive, and mixtures thereof; dibasic alkanoic acid; and an unsaturated acid selected from the group consisting of lower alkenoic acids, lower alkenoic acid anhydrides, and mixtures thereof wherein the mole ratio of dibasic acid to unsaturated acid is from about 6 to about 15 parts dibasic acid to about one part unsaturated acid and the mole ratio of glycol to the total amount of dibasic and unsaturated acid is from about 0.5 part to about 2 parts glycol to about one part dibasic acid and unsaturated acid.

2. A solid propellant resin formulation comprising from about 30% to 50% n-butyl acrylate, from about 5% to 15% methyl acrylate, from about 5% to 10% diallyl diglycollate, and from about 5% to 15% by weight of the total resin formulation of allyl ammonium perchlorate heteropolymerized with from about 25% to 35% by weight of the total resin formulation of alkyd resin comprising the copolymerization product of a glycol selected from the group consisting of a mixture of polyethyleneglycols having a molecular weight of from about 300 to about 650 and having the formula:

$$HO-CH_2-(CH_2-O-CH_2)_n-CH_2OH$$

wherein $n$ is a whole number from 3 to 7 inclusive, a mixture of polypropylene glycols having a molecular weight of from about 425 to about 700 and having the formula:

$$HO-CH-(CH_2-O-CH_2)_m-CH-OH$$
$$\phantom{HO-}CH_3 \phantom{(CH_2-O-CH_2)_m-}CH_3$$

wherein $m$ is a whole number from 3 to 7 inclusive, and mixtures thereof; dibasic alkanoic acid; and an unsaturated acid selected from the group consisting of lower alkenoic acids, lower alkenoic acid anhydrides, and mixtures thereof wherein the mole ratio of dibasic acid to unsaturated acid is from about 6 to about 15 parts dibasic acid to about one part unsaturated acid and the mole ratio of glycol to the total amount of dibasic and unsaturated acid is from about 0.5 part to about 2 parts glycol to about one part dibasic acid and unsaturated acid.

3. A solid propellant resin formulation comprising from about 30% to 50% n-butyl acrylate, from about 5% to 15% methyl acrylate, from about 5% to 10% diallyl diglycollate, and from about 5% to 15% by weight of the total resin formulation of allyl ammonium perchlorate heteropolymerized with from about 25% to 35% by weight of the total resin formulation of an alkyd resin comprising the copolymer of a mixture of polyethylene glycols having a molecular weight of from about 300 to about 650 and having the formula:

$$HO-CH_2-(CH_2-O-CH_2)_n-CH_2OH$$

wherein $n$ is a whole number from 3 to 7 inclusive, a dibasic alkanoic acid, and maleic anhydride wherein the mole ratio of dibasic acid to unsaturated acid is from about 6 to about 15 parts dibasic acid to about one part unsaturated acid and the mole ratio of glycol to the total amount of dibasic and unsaturated acid is from about 0.5 part to about 2 parts glycol to about one part dibasic acid and unsaturated acid.

4. A solid propellant resin formulation comprising from about 30% to 50% n-butyl acrylate, from about 5% to 15% methyl acrylate, from about 5% to 10% diallyl diglycollate, and from about 5% to 15% by weight of the total resin formulation of allyl ammonium perchlorate heteropolymerized with from about 25% to 35% by weight of the total resin formulation of an alkyd resin comprising the copolymer of a mixture of polyethylene glycols having a molecular weight of from about 300 to about 650 and having the formula:

$$HO-CH_2-(CH_2-O-CH_2)_n-CH_2OH$$

wherein $n$ is a whole number from 3 to 7 inclusive, a dibasic alkanoic acid, and fumaric acid wherein the mole ratio of dibasic acid to fumaric acid is from about 6 to about 15 parts dibasic acid to about one part fumaric acid and the mole ratio of glycol to the total amount of dibasic and fumaric acid is from about 0.5 part to about 2 parts glycol to about one part dibasic acid and fumaric acid.

5. A solid propellant resin formulation comprising from about 30% to 50% n-butyl acrylate, from about 5% to 15% methyl acrylate, from about 5% to 10% diallyl diglycollate, and from about 5% to 15% by weight of the total resin formulation of allyl ammonium perchlorate heteropolymerized with from about 25% to 35% by weight of the total resin formulation of an alkyd resin comprising a mixture of polypropylene glycols having a molecular weight of from about 425 to about 700 having the formula:

$$HO-\underset{CH_3}{CH}-(CH_2-O-CH_2)_m-\underset{CH_3}{CH}-OH$$

wherein $m$ is a whole number from 3 to 7 inclusive, a dibasic alkanoic acid, and maleic anhydride wherein the mole ratio of dibasic acid to maleic anhydride is from about 6 to about 15 parts dibasic acid to about one part maleic anhydride and the mole ratio of glycol to the total amount of dibasic acid and maleic anhydride is from about 0.5 part to about 2 parts glycol to about one part dibasic acid and maleic anhydride.

6. A solid propellant resin formulation comprising from about 30% to 50% n-butyl acrylate, from about 5% to 15% methyl acrylate, from about 5% to 10% diallyl diglycollate, and from about 5% to 15% by weight of the total resin formulation of allyl ammonium perchlorate heteropolymerized with from about 25% to 35% by weight of the total resin formulation of an alkyd resin comprising a mixture of polypropylene glycols having a molecular weight of from about 425 to about 700 having the formula:

$$HO-\underset{CH_3}{CH}-(CH_2-O-CH_2)_m-\underset{CH_3}{CH}-OH$$

wherein $m$ is a whole number from 3 to 7 inclusive, a dibasic alkanoic acid, and fumaric acid wherein the mole ratio of dibasic acid to fumaric acid is from about 6 to about 15 parts dibasic acid to about one part fumaric acid and the mole ratio of glycol to the total amount of dibasic and fumaric acid is from about 0.5 part to about 2 parts glycol to about one part dibasic acid and fumaric acid.

7. A solid propellant resin formulation comprising from about 30% to 50% n-butyl acrylate, from about 5% to 15% methyl acrylate, from about 5% to 10% diallyl diglycollate, and from about 5% to 15% by weight of the total resin formulation of allyl ammonium perchlorate heteropolymerized with from about 25% to 35% by weight of the total resin formulation of a copolymer of a mixture of polypropylene glycols having a molecular weight of from about 425 to about 700 having the formula:

$$HO-\underset{CH_3}{CH}-(CH_2-O-CH_2)_m-\underset{CH_3}{CH}-OH$$

wherein $m$ is a whole number from 3 to 7 inclusive, adipic acid, and maleic anhydride wherein the mole ratio of dibasic acid to maleic anhydride is from about 6 to about 15 parts dibasic acid to about one part maleic anhydride and the mole ratio of glycol to dibasic acid and maleic anhydride is from about 0.5 part to about 2 parts glycol to about one part dibasic acid and maleic anhydride.

8. A solid propellant resin formulation comprising about 40% n-butyl acrylate, about 8% methyl acrylate, about 5% diallyl diglycollate and about 10% by weight of the total resin formulation of allyl ammonium perchlorate, heteropolymerized with about 31% by weight of a copolymer of polypropylene glycol, having a molecular weight of about 425, adipic acid and maleic anhydride wherein the mole ratio of adipic acid to maleic anhydride is about 9 to about 1 and the mole ratio of polypropylene glycol to the total amount of adipic acid and maleic anhydride is about 10.5 to 10.

References Cited in the file of this patent

UNITED STATES PATENTS

| | | |
|---|---|---|
| 2,472,963 | Singleton et al. | June 14, 1949 |
| 2,473,801 | Kropa | June 21, 1949 |
| 2,554,567 | Gerhart et al. | May 29, 1951 |

OTHER REFERENCES

Vincent: Ind. & Eng. Chem., November 1937, pages 1267–1269.